United States Patent [19]

Johnson

[11] Patent Number: 4,740,008

[45] Date of Patent: Apr. 26, 1988

[54] CONVERTIBLE WHEELBARROW/CART

[76] Inventor: James A. Johnson, 9225 - 166th St., Cologne, Minn. 55322

[21] Appl. No.: 14,013

[22] Filed: Feb. 12, 1987

[51] Int. Cl.[4] ............................................. B60D 1/14
[52] U.S. Cl. .................................. 280/475; 280/47.18; 280/47.26; 280/47.33; 280/47.37 R
[58] Field of Search ................... 280/653, 656, 43.1, 280/43.14, 43.24, 47.18, 47.26, 47.31, 47.37 R, 415 R, 415 A, 63, 47.33, 47.25, 475

[56] References Cited

U.S. PATENT DOCUMENTS

| | | | |
|---|---|---|---|
| 241,148 | 5/1881 | Marsh | 280/47.18 |
| 772,253 | 10/1904 | Rag | 280/47.31 |
| 1,145,523 | 7/1915 | Thompson | 280/653 |
| 1,242,418 | 8/1917 | Booth | 280/653 |
| 2,468,390 | 4/1949 | Binz | 280/653 |
| 2,494,199 | 1/1950 | Provitola et al. | 280/653 |
| 2,725,242 | 11/1955 | Peplin | 280/47.18 |
| 4,052,079 | 10/1977 | Lehman | 280/47.31 |
| 4,281,950 | 8/1981 | Lehman et al. | 280/47.31 |
| 4,335,897 | 6/1982 | Muller, Jr. | 280/47.26 |

FOREIGN PATENT DOCUMENTS 424729 2/1935 United Kingdom ................ 280/653

*Primary Examiner*—John J. Love
*Assistant Examiner*—Richard Camby
*Attorney, Agent, or Firm*—Orrin M. Haugen; Thomas J. Nikolai; Frederick W. Niebuhr

[57] ABSTRACT

A dual function cart convertible between a wheelbarrow-type load transporter and a vehicle towed cart. The cart comprises a frame supporting a load carrying tube, the frame including a transversing extending axle having relatively large diameter spoked wheels journaled for rotation on opposed ends of the axle. Pivotally secured to the frame is a handle assembly in the form of a rectangular loop which, when latched by a removable rod in a first position orients the handle in an upright plane where the vehicle can be operated as a wheelbarrow. Alternatively, the removable rod may be used to latch the handle in a generally horizontal plane at an elevation facilitating connection thereof by a clevis to a hitch on a towing vehicle. The cart also includes an auxiliary side member which may be secured to the tub for increasing the effective load-carrying volume of the tub.

11 Claims, 2 Drawing Sheets

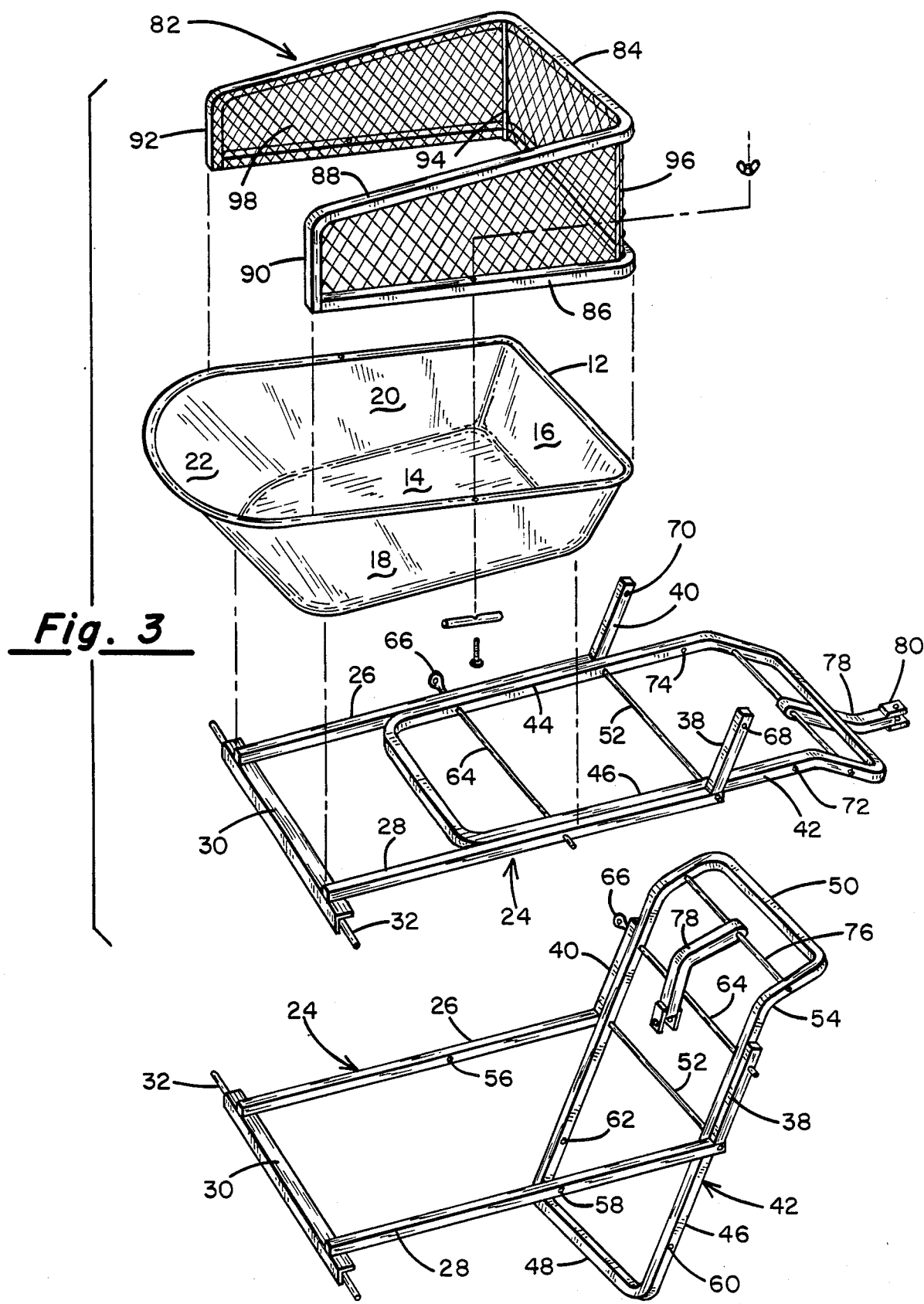

CONVERTIBLE WHEELBARROW/CART

BACKGROUND OF THE INVENTION

I. Field of the Invention

This invention relates generally to a two-wheeled cart-type load transporter, and more particularly to a load transporter which can readily be converted from a manually manipulated wheelbarrow to a vehicle towed cart.

II. Discussion of the Prior Art

The conventional wheelbarrow, conceived and used practically since the invention of the wheel, consists of a concave tub mounted on a generally V-shaped frame and having one forward wheel at the apex of the V and two supporting rear legs projecting down from the frame to hold it horizontal and two handle grips on the free ends of the V-shaped frame. This design, while offering the basic load-transporting function, suffers from several shortcomings. First of all, significant effort is required to balance and control the wheelbarrow on its single, forward wheel. Dumping of the load is also arduous when it is necessary to lift the handles to the point where the load over-centers the forward wheel. Then, too, the hopper or tub size of the wheelbarrow is usually chosen for the heaviest material density, such as sand or concrete, which is to be transported. This, then, proves to be too small for transporting significant quantities of lighter materials, such as leaves, grass clippings, firewood, etc. Another drawback is the fact that the rear support legs are generally somewhat pointed and sink into soft earth when the wheelbarrow is loaded and at repose. Because of the above-mentioned drawbacks, the conventional wheelbarrow is usually used only for short, point-to-point load transportation due to the excess human effort required to move heavy cargo any distance.

Those engaged in farming, landscaping, gold course maintenance, cemetery maintenance and the like commonly use a small garden tractor, a riding lawnmower or a recreational vehicle of the type having large diameter, low pressure balloon tires, to draw carts for hauling soil, sand, sod, tools, etc. for performing some maintenance or repair work at a site. Once at the job-site, the prior art tractor-drawn carts prove to be too cumbersome to manipulate by hand and this often necessitates bringing along an additional wheelbarrow to haul loads at the worksite.

Because of the foregoing considerations, I have devised a load transporting cart which may readily be converted for use as a manually-manipulated wheelbarrow or vehicle-transported cart. Various prior art wheelbarrows are known of which can be converted to a more compact configuration for ease of carrying or transporting the wheelbarrow itself. In this regard, reference is made to the U.S. Pat. Nos. 1,145,523, to Thompson, 1,242,418 Booth, 2,468,390 Binx and 2,494,199 Provitola et al. Still other patents disclose a wheelbarrow-type vehicle that can be converted to a handtruck or two-wheel dolly and, in this latter regard, reference is made to the U.S. Pat. No. 241,148, to Marsh.

The prior art patent to Peplin U.S. Pat. No. 2,725,242 describes a cart design which is arranged to be pulled, either by hand or by a vehicle (bicycle). The design of the cart disclosed in the Peplin patent does not readily permit it to function as a wheelbarrow where a lifting and pushing force is to be applied.

While the Lehman U.S. Pat. No. 4,052,079 describes an aperture for allowing a conventional wheelbarrow to be towed by a tractor-type vehicle, the wheelbarrow itself is not convertible. Instead, a low, two-wheeled dolly on which the wheelbarrow's legs rest, is arranged to be towed. The Lehman et al U.S. Pat. No. 4,281,950 shows a somewhat related configuration, i.e., a trailer for a wheelbarrow.

The Mueller U.S. Pat. No. 4,335,897 has some resemblance to the load transporting vehicle of the present invention in that it comprises a tub supported on a frame having a transversely extending axle and two large diameter spoked wheels journaled on each end of the axle. However, the legs and handle in the Mueller patent are fixed and there is no provision for allowing conversion to a towed vehicle.

SUMMARY OF THE INVENTION

According to the present invention, there is provided a push-type wheelbarrow comprising a generally rectangular frame having a transversely extending axle disposed at the forward end thereof and a handle assembly pivotally secured proximate the other end of the frame. The frame supports a concave tub in which the load to be transported is placed. Secured to opposed ends of the transversely extending axle and journaled for rotation thereon are relatively large diameter spoked wheels which partially straddle the tub. The pivoting handle can be selectively latched in a first disposition so that the lower end portion of the handle functions as the legs of a wheelbarrow while the upper end of the handle assembly provides the necessary handgrips for lifting and pushing it. Alternatively, the handle assembly can be rotated into general alignment with the horizontally disposed frame and again latched in position. The hitch mechanism used to couple the load transporter to the towing vehicle comprises a gooseneck coupling pivotally secured to the handle at one end thereof and having a clevis-type connection at its other end. The pivotable connection allows the clevis hitch to rotate about a pivotal axis and it is held in repose by a removable latching rod when the load transporter is in its wheelbarrow configuration but released to a point of contact with the underside of the upper transversely extending handgrip portion of the handle assembly to prevent further rotation of the frame relative to the axle when the clevis hitch is secured to the draft vehicle. Because of the manner in which the handle assembly is bent to form the handgrip region when functioning as a wheelbarrow, the clevis hitch pivotally secured to the handle is at an appropriate elevation to join to conventional garden tractors or ATVs.

To increase the carrying capacity of the load transporter when functioning either as a wheelbarrow or a towed cart, a removable extension can be added to the sides of the tub to increase its overall depth.

OBJECTS

It is accordingly the principal object of the present invention to provide a vehicle employing integral and minimal adjustment and converting it from a hand-operated wheelbarrow to a vehicle towed cart.

Another object of the invention is to provide a cargo-bearing vehicle of the type described which permits it to be readily pulled behind a tractor, lawnmower or other type of powered draft vehicle.

Still another object of the invention is to provide a means for connecting the load transporter to the generic hitch mechanism for conventional lawn tractors or riding lawnmowers, but where the connecting means does not interfere with the functioning of the load transporter as a wheelbarrow.

Yet another object of the invention is to provide a detachably mounted tub extension so that a larger volume of material may be transported.

These and other objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE DRAWINGS

FIG. 3 is a blown-apart view of the present invention with the wheels removed;

FIG. 4 is a view showing the frame and pivotable handle assembly when configured as a wheelbarrow.

DESCRIPTION OF THE PREFERRED EMBODIMENT

Figure 1:
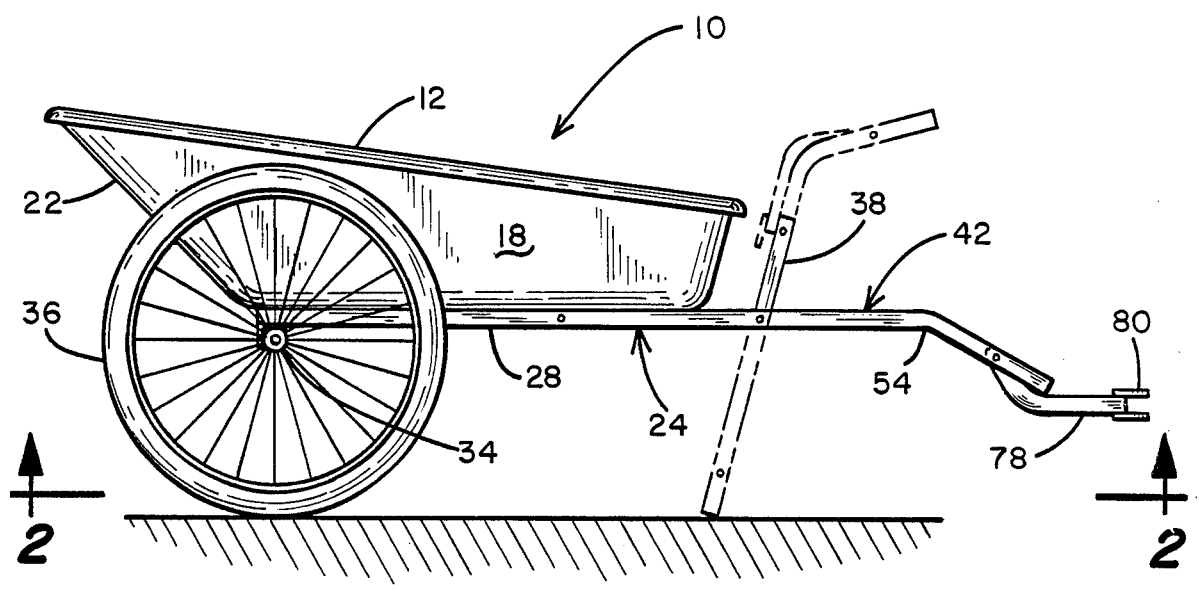
FIG. 1 is a side elevation of the load transporter of the present invention.

Referring to FIG. 1, indicated generally by numeral 10, is a load transporter which is especially designed so as to be convertible from a manually pushed wheelbarrow-type vehicle to a towed cart. It is seen to include a load-carrying tub 12 of a generally concave configuration having a generally flat bottom 14 (FIG. 3) and integrally formed, upwardly extending side walls including a rear wall 16, first and second side walls 18 and 20 and a smoothly curved front wall 22 joining the side walls 18 and 20 to one another and to the bottom 14. The side and end walls terminate in a semicircular outwardly curved edge which resists deformation of the tub. The front wall 22 is somewhat sharply inclined with respect to the bottom 14 which can best be observed in the side view of FIG. 1 to facilitate dumping of the load.

The tub 12 is supported on a frame, indicated generally by numeral 24, and the frame is comprised of a pair of spaced-apart side rails 26 and 28 which are welded or otherwise attached to a transversely extending angle bar or cross member 30 located at the forward ends of the side rails 26 and 28.

Figure 2:
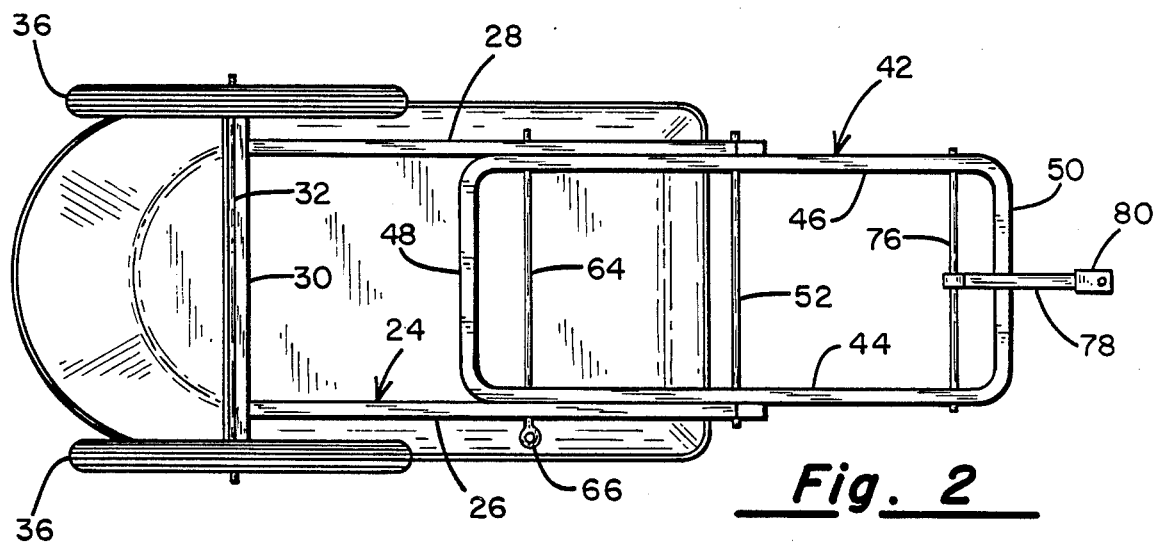
FIG. 2 is a bottom view of the load transporter of FIG. 1.

Referring to FIG. 2, welded, bolted or otherwise affixed to the underside of the cross member 30 is a cylindrical rod 32. The end portions of the rod 32 are of a diameter which allows a tubular hub 34 of a large-diameter spoked wheel 36 to fit about the axle. The hub 34 may contain conventional ball bearing assemblies (not shown) such that the wheels 36 freely rotate about the ends of the axle 32. The length of the transversely extending axle is such that the wheels 36 will partially straddle the tub 12 when the tub is bolted or otherwise attached to the frame rails 26 and 28.

As can best be seen in FIGS. 1 and 3, welded to or integrally formed with the frame rails 24 and 26 at the rear ends thereof are upwardly and rearwardly projecting end segments 38 and 40. With no limitation intended, it has been found that by inclining the end segments 38 and 40 at an angle of approximately 61° with respect to the frame rails 26 and 28, the handle assembly, yet to be described, will be appropriately inclined when configured in the wheelbarrow mode.

The handle assembly itself is indicated generally by numeral 42 and is preferably formed from tubular metal of rectangular cross-section, either as a single piece or as one or more joined segments so as to define a generally rectangular open loop configuration. As such, it includes side members 44 and 46 and end members 48 and 50. As can be seen in FIGS. 1, 2 and 4, a portion of the side members 44 and 46 are bent as at 54 so that the end member 50 is no longer coplanar with the end member 48 of the handle assembly 42. Human engineering considerations have dictated that the angle between the upper lateral end of the rectangular loop of the handle assembly should be about 53° from the longitudinal axis of the remaining portions of the side members 44 and 46. The width dimension of the handle assembly 42 is slightly less than the spacing between the parallel frame rails 26 and 28 so that it can fit therebetween.

Extending through the frame rails 26 and 28 and the side members 44 and 46 of the handle assembly are aligned apertures and fitted through these apertures is a pivot rod 52 which permits the handle assembly to be rotated relative to the stationary frame 24 about the rod 52 as an axle.

As can best be seen in FIG. 4, a series of holes are drilled through the rectangular tubing frame rails 26 and 28 at 56 and 58 and through the side members 44 and 46 of the handle assembly as at 60 and 62 such that when the bottom portion of the handle assembly 48 is rotated into the plane defined by the parallel side rails 26 and 28, all four holes 56–62 will be aligned, permitting a latching rod 64 to be passed therethrough to hold the handle assembly and frame in general alignment when the transporter is configured as a cart to be towed by a vehicle. The latching rod may have a ring pull 66 at one end thereof to facilitate its removal and insertion through these aligned apertures.

In a similar fashion, and as can be seen from the blownapart drawing of FIG. 3, the upwardly projecting frame extensions 38 and 40 also have apertures 68 and 70 passing through them. Furthermore, at an appropriate position relative to the pivot rod 52, there is formed through the side members 44 and 46 of the handle assembly holes 72 and 74. Thus, when the latching rod 64 is removed from the aligned apertures 56–62, the handle assembly 42 may be pivoted about the pivot rod 52 to bring holes 72 and 74 into alignment with the holes 68 and 70. At this point, the latching rod 64 may be inserted through these latter holes as indicated in the view of FIG. 4. When the handle is thus latched, its lower end 48 will rest upon the ground and serve as the legs when the load transporter is in its wheelbarrow configuration. This configuration can best be seen in the view of FIG. 1 where the handle is shown in ghost lines.

Extending between the side members 44 and 46 of the handle assembly 42, near the end 50 thereof is a further rod 76 to which is connected a gooseneck arm 78 having a clevis coupling 80 at the free end thereof. As is shown in the views of FIGS. 1 and 3, when the load transporter is in its vehicle towed cart configuration, the gooseneck arm 78 is swung about the rod 76 until it abuts the end portion 50 of the handle assembly. Now, when the clevis 80 is joined to a towing vehicle in a conventional fashion, the handle assembly 42 cannot tip downwardly about the axle 32 and the load will be held in a generally horizontal disposition at a height about 9" from the ground. This is somewhat standard hitch elevation on conventional garden tractors and other vehicles used for towing. When the frame is configured for operation as a wheelbarrow, however, the gooseneck arm 78 swings about the pivot rod 76 and rests against the removable latching rod 64, as is best seen in the view of FIG. 4.

Figure 5:
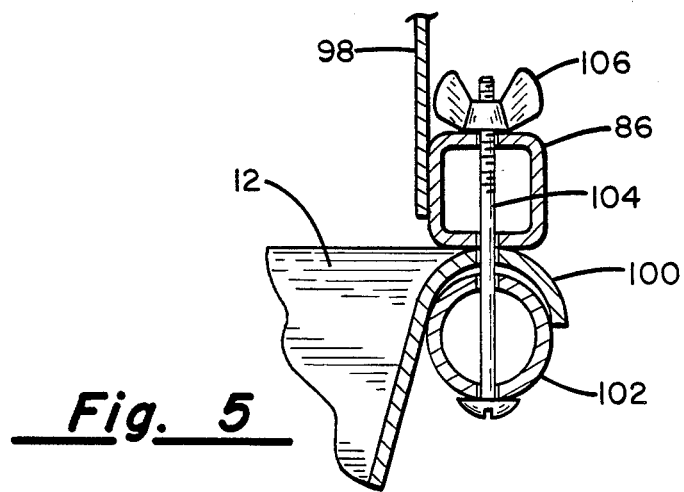
FIG. 5 is a cross-sectional view showing the manner in which the tub extension is joined to the tub.

Referring next to FIGS. 3 and 5, provision is made for increasing the capacity of the tub 12. More particularly, a tub extender indicated generally by numeral 82 is adapted to be coupled to the upper edge rim of the tub 12. The extension 82 comprises a generally U-shaped framework 84 having a base frame member 86 and a upper frame member 88 which are spaced apart from one another by end pieces 90 and 92 and corner braces 94 and 96. The frame supports a screen or mesh 98 as illustrated.

In fastening the extension 82 to the upper edge of the tub 12, it is to be recalled that the tub 12 has its side edges rolled as at 100 in FIG. 5, the diameter of the roller portion allowing one or more tubes 102 to fit thereunder. Passing through the tube 102, the rolled edge 100 of the tub 12 and the base frame member 86 are bolts 104 which are each threaded to receive a wing nut 106 thereon. This allows ready attachment and removal of the tub extension 84.

The tub 12 can be fabricated from metal or from molded polyethylene or other suitable plastic. The wheels 36 may typically be 26" in diameter and have rubber tires mounted on a rim supported away from the central hub by spokes. The frame members may be fabricated from extruded metal tubing of an appropriate gauge to provide the requisite strength.

It should be relatively apparent to those skilled in the art from the preceding detailed description that the load transporter may be converted from a wheelbarrow-type vehicle to a towed cart and vice versa without the use of any special tools. It is only necessary to remove and reposition the latching rod 64 all as previously described.

This invention has been described herein in considerable detail in order to comply with the Patent Statues and to provide those skilled in the art with the information needed to apply the novel principles and to construct and use much specialized components as required. However, it is to be understood that the invention can be carried out by specifically different equipment and devices, and that various modifications, both as to equipment details and operating procedures, can be accomplished without departing from the scope of the invention itself.

What is claimed is:

1. A dual function load transporter convertible between a manually operated wheelbarrow and a vehicle towed cart comprising, in combination:
   (a) a frame comprising first and second parallel, spaced apart side members, each having first and second ends with a transversely extending bar attached to said first and second side members at said first ends thereof, said transversely extending bar including an axle, said frame further including first and second upwardly sloping end segments respectively attached to said first and second side members at said second ends thereof;
   (b) wheel means journaled for rotation on said axle for supporting said frame above the ground;
   (c) a tub secured to said side members of said frame for containing the load to be transported;
   (d) a generally open rectangular shaped handle member of a width slightly less than the spacing between said first and second frame side members and of a predetermined length dimension, said handle member being pivotally joined to said frame side members proximate said second ends thereof for movement between a first orientation where said handle member is aligned with said first and second side members and out of contact with the ground and a second orientation where said handle member is aligned with said upwardly sloping end segments, said length dimension being such that one end of said handle member is in engagement with the ground to maintain said side members horizontal when said handle member is in said second orientation; and
   (e) means for releasably latching said handle member in either of said first and second orientations.

2. The load transporter as in claim 1 wherein said rectangular handle member has an end portion bent out of the plane of the rectangle at a predetermined angle such that when said handle member is latched in said first orientation said end portion of said handle member is downwardly directed and when latched in said second orientation is upwardly and rearwardly extending.

3. The load transporter as in claim 1 wherein said wheel means includes first and second wheels journaled to opposite ends of said axle and extending outwardly beyond the sides of said tub.

4. A dual function load transporter convertible between a manually operated wheelbarrow and a vehicle towed cart comprising, in combination:
   (a) a frame comprising first and second parallel, spaced apart side members, each having first and second ends with a transversely extending bar attached to said first and second side members at said first ends thereof, said transversely extending bar including an axle, said frame further including first and second upwardly sloping end segments respectively attached to said first and second side members at said second ends thereof;
   (b) wheel means journaled for rotation on said axle for supporting said frame above the ground;
   (c) a tub secured to said side members of said frame for containing the load to be transported;
   (d) a generally open, rectangular-shaped handle having one end portion thereof bent out of the plane of the rectangle at a predetermined angle, the width of said handle being slightly less than the spacing between said first and second frame side members and pivotally joined to said frame side members proximate said second ends thereof for movement between a first orientation where said handle member is aligned with said first and second side members and a second orientation where said handle member is aligned with said upwardly sloping end segments, said one end portion of said handle member being downwardly directed when said handle member is latched in said first orientation and upwardly and rearwardly extending when latched in said second orientation;

(e) means for releasably latching said handle member in either of said first and second orientations; and (f) a gooseneck shaped hitch pivotally connected between the sides defining said open rectangular handle member and engaging and supporting said end portion of said handle member when said hitch is coupled to a towing vehicle.

5. The load transporter as in claim 1 wherein said means for releasably latching said handle member in said first orientation includes an elongated pin insertable through aligned apertures in said first and second side members and said handle member and said means for releasably latching said handle member in said second orientation includes said elongated pin insertable through aligned apertures in said upwardly sloping end segments and said handle member.

6. The load transporter as in claim 1 wherein said tub comprises a generally planar bottom with three generally vertically extending side walls and a fourth upwardly and outwardly sloping wall all integrally joined with one another.

7. The load transporter as in claim 6 wherein a load placed in said tub tends to be centered over said transversely extending bar.

8. The load transporter as in claim 4 wherein said gooseneck shaped hitch and said end portion of said handle member are bent such that said first and second side members are level when said hitch is secured to a towing vehicle.

9. A dual function load transporter capable of conversion from a wheelbarrow to a vehicle-towed cart comprising:

(a) a frame having a pair of spaced apart side rails supported by a transversely extending axle;

(b) wheels of a predetermined diameter journaled for rotation on said axle;

(c) a load containing tub attached to said frame;

(d) a rectangular shaped handle of a predetermined length and width dimension, said width dimension allowing said handle to fit between said spaced apart side rails and pivotally mounted to said side rails for rotation between first and second operating positions; and (e) means for releasably securing said pivotally mounted handle in a first disposition in general parallel alignment with said side rails and in a second disposition at a predetermined inclined angle to said side rails, said predetermined length dimension maintaining said side rails horizontal with one end of said handle engaging the ground when said handle is in said second disposition.

10. The dual function load transporter of claim 9 and further including (a) a hitch member pivotally attached to said rectangular shaped handle and shaped to support said side rails in a generally horizontal position when said handle is in said first disposition and said hitch member is coupled to a mating hitch element on a towing vehicle.

11. The load transporter as in claim 9 wherein said rectangular shaped handle has an upper end portion thereof turned out of the plane of the rectangle to form a hand grip.

* * * * *